(12) United States Patent
Safari et al.

(10) Patent No.: US 12,498,057 B2
(45) Date of Patent: Dec. 16, 2025

(54) METHOD OF PREPARING A PIPE-SECTION

(71) Applicant: TECHNIP FRANCE, Courbevoie (FR)

(72) Inventors: Javad Safari, Aberdeenshire (GB); Matthew Paul Gready, Aberdeenshire (GB)

(73) Assignee: TECHNIP FRANCE (FR)

( * ) Notice: Subject to any disclaimer, the term of this patent is extended or adjusted under 35 U.S.C. 154(b) by 1258 days.

(21) Appl. No.: 16/771,713

(22) PCT Filed: Dec. 18, 2018

(86) PCT No.: PCT/IB2018/001616
§ 371 (c)(1),
(2) Date: Jun. 11, 2020

(87) PCT Pub. No.: WO2019/123017
PCT Pub. Date: Jun. 27, 2019

(65) Prior Publication Data
US 2021/0071783 A1    Mar. 11, 2021

(30) Foreign Application Priority Data
Dec. 21, 2017   (GB) .................................... 1721536

(51) Int. Cl.
*F16L 1/16*      (2006.01)
*B23K 9/025*    (2006.01)
(Continued)

(52) U.S. Cl.
CPC ............ *F16L 1/161* (2013.01); *B23K 9/0253* (2013.01); *B23K 9/0282* (2013.01); *B23K 9/18* (2013.01);
(Continued)

(58) Field of Classification Search
CPC ..... F16L 1/161; B23K 9/0253; B23K 9/0282; B23K 9/18; B23K 9/235; B23K 20/02
(Continued)

(56) References Cited

U.S. PATENT DOCUMENTS 2,133,926 A   10/1938 Ransom
4,772,771 A    9/1988 Murayama
(Continued)

FOREIGN PATENT DOCUMENTS

CN      106112222 A    11/2016
FR       2582674 A1    12/1986
(Continued)

OTHER PUBLICATIONS

UKIPO Search Report, dated Mar. 21, 2018. Application No. GB 1721536.9. Total 1 page.
(Continued)

*Primary Examiner* — Edward F Landrum
*Assistant Examiner* — Thomas J Ward
(74) *Attorney, Agent, or Firm* — OSTROLENK FABER LLP

(57) ABSTRACT

A method of preparing a pipe-section for welding to another pipe-section to form a pipeline comprising a plurality of said pipe-sections, the method comprising at least the steps of: (i) providing a pipe-section having first and second pipe-ends; (ii) defining a first portion L1 of the longitudinal length of the pipe-section from the first pipe-end being in the range 3% to 40% of the overall length of the pipe-section; (iii) defining a second portion L2 of the longitudinal length of the pipe-section from the end of the first portion L1 towards the second pipe-end; (iv) heating at least the first portion L1 to at least a first temperature T1 of at least 500° C. for at least 2 minutes; (v) maintaining a second temperature T2 of the second portion L2 during step (iv) below the first tempera-
(Continued)

ture T1. The invention is able to reduce the strain capacity during reel-laying of a pipeline formed from a plurality of pipe sections formed by the invention.

15 Claims, 4 Drawing Sheets

(51) Int. Cl.
    *B23K 9/028*     (2006.01)
    *B23K 9/18*     (2006.01)
    *B23K 9/235*     (2006.01)
    *B23K 11/087*     (2006.01)
    *B23K 11/34*     (2006.01)
    *B23K 13/02*     (2006.01)
    *B23K 31/02*     (2006.01)
    *B23K 31/12*     (2006.01)
    *B23K 101/10*     (2006.01)
    *B23K 103/04*     (2006.01)

(52) U.S. Cl.
    CPC .......... *B23K 9/235* (2013.01); *B23K 11/0873* (2013.01); *B23K 11/34* (2013.01); *B23K 13/025* (2013.01); *B23K 31/027* (2013.01); *B23K 31/12* (2013.01); *B23K 2101/10* (2018.08); *B23K 2103/05* (2018.08)

(58) Field of Classification Search
    USPC .................................. 219/121.63; 405/195.1
    See application file for complete search history.

(56) References Cited

U.S. PATENT DOCUMENTS

| | | | | |
|---|---|---|---|---|
| 5,988,301 A | * | 11/1999 | Lundell | ............... E21B 17/0426 |
| | | | | 175/320 |
| 6,817,633 B2 | * | 11/2004 | Brill | ....................... E21B 17/042 |
| | | | | 285/333 |
| 9,625,078 B2 | * | 4/2017 | Hesjevik | ................. F16L 1/123 |
| 9,885,431 B2 | * | 2/2018 | Pepin | .................. F16L 13/0263 |
| 2015/0273636 A1 | | 10/2015 | Rajagopalan | |
| 2016/0362759 A1 | | 12/2016 | Schmidt | |

FOREIGN PATENT DOCUMENTS

| | | | | |
|---|---|---|---|---|
| GB | 2406367 B | * | 7/2007 | ............. C23F 13/18 |
| RU | 2015153519 A | | 6/2017 | |
| SU | 1497264 A1 | | 7/1989 | |

OTHER PUBLICATIONS

Herve Quintin, "Deep 7 High-Performance Pipelay" (May 2014) *Technology News from Subsea* Total 16 pages.
P. Yan, et al. "Induction Welding And Heat Treatment Of Steel Pipes: Evolution Of Crystallographic Texture Detrimental To Toughness" (2010) vol. 25: No. 2. *Science and Technology of Welding and Joining* Total 5 pages.
"Offshore Standard DNV-OS-F101 Submarine Pipeline Systems" (Oct. 2013) *Det Norske Veritas AS.* Electronic PDF version: http://www.dnv.com is the official binding version. Total 372 pages.

* cited by examiner

METHOD OF PREPARING A PIPE-SECTION

CROSS-REFERENCE TO RELATED APPLICATIONS

The present application is a 35 U.S.C. §§ 371 national phase conversion of PCT/IB2018/001616, filed Dec. 18, 2018, which claims priority to United Kingdom Patent Application No. 1721536.9, filed Dec. 21, 2017, the contents of which are incorporated herein by reference. The PCT International Application was published in the English language.

The present invention relates to a method of preparing a pipe-section for welding to another pipe-section to form a pipeline. Optionally the pipe-section is suitable for reeling onto a reel and for reel-laying from an off-shore vessel into a sea-environment. The present invention also provides a pipeline formed from a plurality of said pipe-sections, optionally a reel-lay pipeline, a method for forming same, and a method of reel-laying a pipeline.

BACKGROUND TO THE INVENTION

In the field of oil and gas offshore applications, rigid pipelines are generally used to convey oil and/or gas from a subsea structure to a surface facility. A rigid pipeline is typically formed of a plurality of pipe joints or pipe-sections of short length, such as 12 m, 24 m or of greater length that are welded together to form "stalks", forming in turn the pipeline.

A typical pipe-section comprises a steel tubular member which provides resistance to internal and external pressure. Said steel tubular member may be lined with metallic or plastic tubes to prevent corrosion of the pipeline. In addition, an external coating may be applied to enhance thermal insulation of the pipeline and its corrosion resistance.

There are two main typical kinds of pipe-section, which differ from one another by their manufacturing method: seam-welded pipes, such as High Frequency Welded (HFW) pipes and Submerged Arc Welding Longitudinal (SAWL) pipes, and seamless pipes. Seam-welded pipes are favored as they are cost effective compared to seamless pipes, even if the mechanical properties of seam-welded pipes are generally inferior to seamless pipes.

Seam-welded pipes result from a cold forming operation of a metal strip or plate followed by a longitudinal or a helical seam weld to join the edges of the metal strip or plate. The cold forming operation influences the mechanical properties of the steel pipe, and in particular, it generally leads to an increase of the yield-to-tensile (Y/T) ratio and a decrease of elongation. A too high Y/T ratio and a too low elongation of a pipe section may make it unsuitable for subsequent installation according to the reel-lay method.

There are three main methods of pipe laying depending on the depth of the water where the pipeline has to be installed. For deep and ultra-deep water, a method called "reel-lay" is used for the installation of pipelines. Pipe-sections are welded onshore forming stalks which are spooled on large vessel drum, commonly simply referred to as a reel. Then, for installing the pipe the stalks are unreeled, straightened and lowered to the seabed.

Reel-laying is a relatively fast method of offshore, generally subsea, pipelaying, considerably reducing the CAPEX and OPEX costs of laying a pipeline. However, the reeling and unreeling of the stalks may lead to high localized strain within pipe-sections, resulting in local buckling of the stalks. This is mainly due to discontinuities, also referred to as 'mismatches', in geometry and mechanical properties between pipe-sections, such as discontinuities in wall thickness and yield stress. To limit such discontinues and hence to mitigate local buckling during the reeling operations, pipe-sections normally have to show a maximum Y/T ratio of 0.9 and a minimum uniform elongation of 8%. These requirements are in particular set by standard DNV-OS-F101 published on October 2013 (page 136, section I300—paragraph 303, guidance note).

As discussed above, cold forming operations result in an increase of the Y/T ratio which may be above the limit ratio and a decrease of uniform elongation which may be under 8%. To be in line with DNV-OS-F101 cited above, after longitudinal welding operation, it has been suggested to submit the overall pipe-section to a heat treatment for reducing residual stress within said pipe-section and reach the Y/T ratio and elongation value defined in said standard. However, such a heat treatment significantly increases the cost of the pipe-section, as specific and cumbersome equipment has to be provided. An alternative method to heat treatment is to design the pipe-section according to Strain Based Design (SBD) method. However, the cost of pipe-sections resulting from such method remains dissuasive.

Hence, it is an object of the present invention to provide a method for reducing residual stress within a pipe-section to make it suitable for reel-lay installation operation which does not involve additional cumbersome equipment and which is cost effective.

SUMMARY OF THE INVENTION

According to one aspect, there is provided a method of preparing a pipe-section for welding to another pipe-section to form a pipeline comprising a plurality of said pipe-sections, the method comprising at least the steps of:
   (i) providing a pipe-section having first and second pipe-ends;
   (ii) defining a first portion L1 of the longitudinal length of the pipe-section from the first pipe-end being in the range 3% to 40% of the overall length of the pipe-section;
   (iii) defining a second portion L2 of the longitudinal length of the pipe-section from the end of the first portion L1 towards the second pipe-end;
   (iv) heating at least the first portion L1 to at least a first temperature T1 of at least 500° C. for at least 2 minutes;
   (v) maintaining a second temperature T2 of the second portion L2 during step
   (iv) below the first temperature T1.

According to another aspect, there is provided a pipe-section obtainable by a method as defined herein.

According to another aspect, there is provided a pipeline comprising a plurality of conjoined pipe-sections as defined herein.

According to another aspect, there is provided a method of forming a pipeline comprising a plurality of conjoined pipe-sections as defined herein comprising the steps of:
   providing at least two pipe-sections as defined herein;
   providing a pre-heat treatment to the ends of the pipe-sections to be joined; and
   girth welding the two pipe-sections together.

According to another aspect, there is provided a method of reel-laying a reel-lay pipeline from a vessel comprising at least the steps of:
   (a) providing a reel-lay pipeline as defined herein on a reel;

(b) passing the reel-lay pipeline from the reel to a pipeline-launch assembly and into a sea-environment.

DESCRIPTION OF THE DRAWINGS

The invention can be better understood with reference to the following detailed description together with the appended illustrative drawings in which.

DETAILED DESCRIPTION

Various examples and aspects of the invention will now be described in detail with reference to the accompanying figures. Still other aspects, features, and advantages of the present invention are readily apparent from the entire description thereof, including the figures, which illustrates a number of exemplary embodiments and aspects and implementations. The invention is also capable of other and different examples and aspects, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa.

Figure 1:
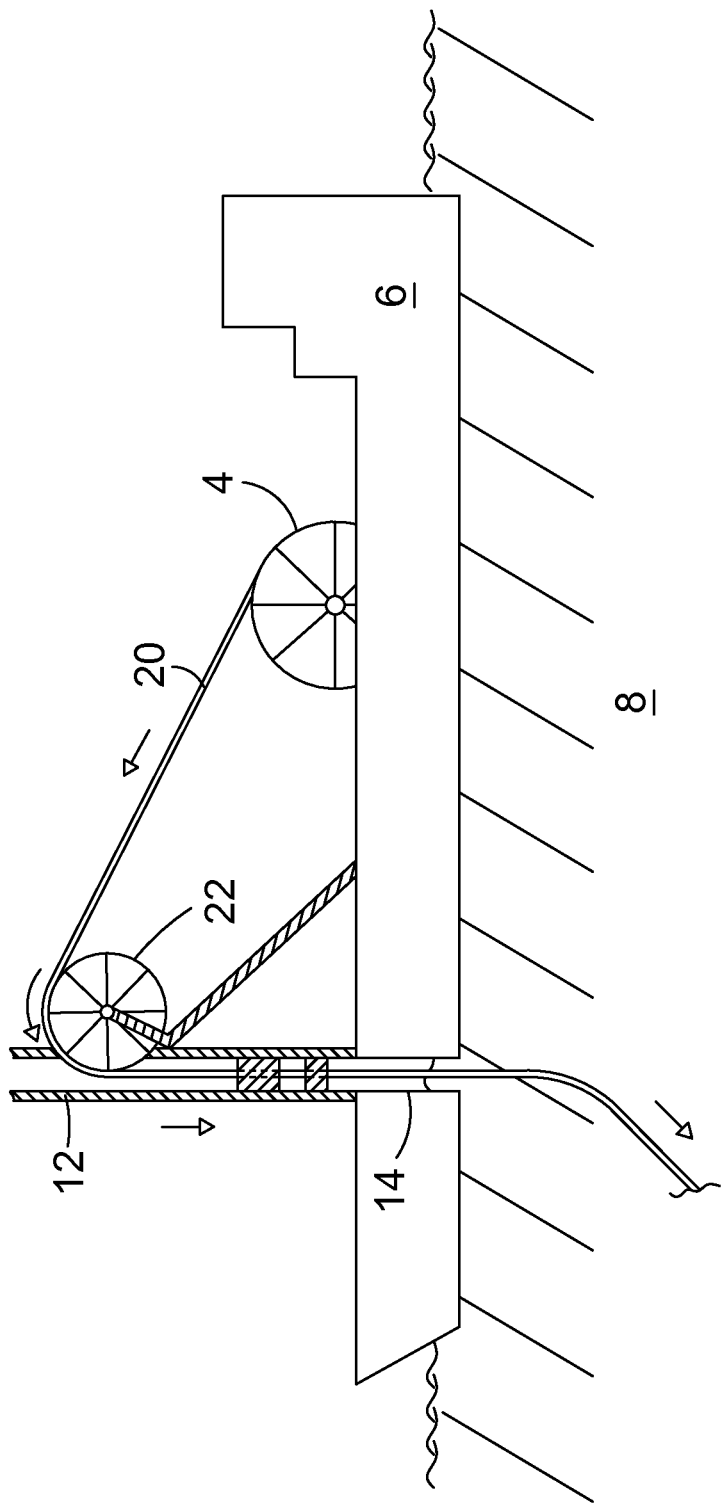
FIG. 1 is a schematic side view of reel-laying a pipeline extending from a reel, over an aligner, and through a lay-tower on a vessel.

FIG. 1 shows a method of reel-laying a pipeline 20 from a reel 4 on a vessel 6 in the sea 8. In this method, the pipeline 20 is extended from the reel 4 over an aligner or aligner wheel 22 at or near the top of a lay-tower 12, down through the lay-tower 12, and subsequently through a moonpool 14 or over the side or back of the vessel, and into the sea 8, generally for laying on a seabed (not shown). This method of reel-laying is commonly faster and more economic than the J-lay method, and is therefore preferred where possible. The lay-tower 12 can be rotated to be at a non-vertical angle relative to the vessel 6 in a manner known in the art.

Where the pipeline 20 is relatively flexible, typically having a small outer diameter, the pipeline may not be affected or misshapen during its change in direction when being reeled onto the reel 4, and when then being subsequently unreeled from the reel 4, passed over the aligner 22 and straightened into the vertical pathway of the lay-tower 12.

Inter alia, it is desired to extend the usefulness of reel-laying to further pipelines, including those of a greater outer diameter, such as >6 inches (>15 cm), including for example pipelines having a diameter of 8 inches up to 20 inches (20.3 cm to 50.8 cm), and optionally with a liner comprising a wall thickness in the range 1 mm-8 mm. The present invention provides a method of preparing a pipe-section for welding to another pipe-section to form a pipeline. Optionally, the method is for preparing a pipe-section suitable for reeling onto a reel and for reel-laying.

Optionally, the pipeline is suitable for reeling onto a reel, and for unreeling from the reel, passing over an aligner, and being straightened into the vertical pathway of a lay-tower.

The pipe-section may be any metallic pipe-section able to sustain an internal pressure between 0.1 MPa and 100 MPa, and an external pressure comprised between 0.1 MPa and 50 MPa.

Optionally, the pipe-section may be a preformer of a pipe-section.

Optionally, the pipe-section is a preformer suitable for forming part of a mechanically lined pipe or a clad pipe, sometimes termed a 'bi-metallic' pipe. A particular form of bi-metallic pipe section has a main metal tube as a relatively thick outer pipe, typically formed from steel such as carbon steel, and an internal liner having a thickness typically in the range 2.5 mm-3 mm, which is hydraulically or mechanically expanded within the outer pipe to form a pipe-section which is suitable for a mechanically lined pipeline (MLP).

Optionally, the pipe-section is formed as an integral piece having first and second pipe-ends.

Alternatively, the pipe-section is formed from a flat sheet that is rolled into a cylinder and at least partly welded along a 'seam' to have first and second pipe-ends. That is, the pipe-section has been formed with at least some inside or internal welding along the seam. Such welding may be continuous or intermittent or at least partly continuous, so as to at least provide a sufficiently formed pipe-section able to undergo the remaining steps of the method of the present invention.

Alternatively, the pipe-section is formed from a flat sheet that is rolled into a cylinder to have first and second pipe-ends, and fully seam-welded, typically requiring both internal welding and external welding along the seam.

Optionally, an external coating, or an internal liner, or both an external coating and an internal liner may be added to the pipe-section after the method of the present invention.

Optionally, the pipe section is formed from a carbon steel. Advantageously, the pipe-section is formed from one of the group comprising a carbon steel from grade X52, X56, X60, X65, X70 or X80 according to API 5L "Specification for Line Pipe", 43d edition, December 2004.

Optionally, the pipe section is formed from a carbon steel such as X100.

Optionally, the pipe-section is formed from a C—Mn steel (carbon manganese steel). The C—Mn steel may comprise the following elements by percentage by weight:

| | |
|---|---|
| C | 0.03%-0.17% |
| Si | 0.20%-0.45% |
| Mn | 1.25%-1.85% |

| | |
|---|---|
| P | 0.020% |
| S | 0.010% |
| V | 0.04%-0.10% |
| Nb | 0.04%-0.08% |
| Ti | 0.04%-0.06% |

Alternatively, the pipe section may be formed from a duplex stainless steel or a martensitic stainless steel. Preferably, the duplex stainless steel grade or martensitic stainless steel is a 22 Cr duplex, 25 Cr Duplex, 13 Cr-2 Mo or a 13Cr-2.5 Mo according to DNV-OS-F101, October 2013, page 120, table 7-10.

The duplex stainless steel and/or the martensitic stainless steel may comprise the following elements by percentage by weight:

| | |
|---|---|
| C | 0.015%-0.030% |
| Mn | 1.20%-2.00% |
| Si | 1% |
| P | 0.025%-0.035% |
| S | 0.003%-0.020% |
| Ni | 4.50%-8% |
| Cr | 12%-26% |
| Mo | 2%-4% |
| N | 0.14%-0.35% |

The pipe-section may be formed from a material having an elongation of at least 8%.

Preferably, the pipe-section may be formed from a material having a Young modulus between 200 GPa and 250 GPa.

Optionally step (i) of the method of the present invention for providing a pipe-section having first and second pipe-ends, comprises the steps of:
  preparing a metal plate or a strip, for example by edge milling the edges of said metal plate or strip,
  forming said metal plate or strip into a tube having first and second pipe-ends, (for example by a step of folding the plate or strip by Uing and Oing forming (UOE) or by roll forming or by J-ing, C-ing and O-ing process (JCOE)), and
  performing at least one seam weld along the tube to join the edges of the metal plate or strip to form the pipe-section.

The seam weld may be longitudinal, i.e. parallel to the longitudinal axis of the pipe-section.

Optionally, the seam weld may be helical.

The seam weld may be performed by one or more of the group comprising: High Frequency Induction (HFI), Electric Resistance Welding (ERW), and Submerged Arc Welding.

Optionally, an external seam weld and an internal seam weld are performed along the tube to join the edges of the metal plate or strip and to form the pipe-section.

An inspection such as a visual inspection or an ultrasonic inspection may be performed after each weld.

To enhance the quality of the seam weld, an intermediate step of washing the tube may be performed before performing the seam weld.

Optionally, the cold work percentage (% CW) for providing a pipe section for step (i) of the present invention is in the range 3% to 8%.

Thereafter, at least steps (ii)-(v) of the method of the present invention can be carried out as follow:
  (ii) defining a first portion L1 of the longitudinal length of the pipe-section from the first pipe-end being in the range 3% to 40% of the overall length of the pipe-section;
  (iii) defining a second portion L2 of the longitudinal length of the pipe-section from the end of the first portion L1 towards the second pipe-end;
  (iv) heating at least the first portion L1 to at least a first temperature T1 of at least 500° C. for at least 2 minutes;
  (v) maintaining a second temperature T2 of the second portion L2 during step (iv) below the first temperature T1.

Optionally, the pipe-section formed by the present invention undergoes one or more additional steps to further prepare the pipe section for use in a pipeline. Such steps can include at least one or more of:
  non-destructive testing of the welds to detect potential defects, and/or
  mechanical expansion of the pipe-section followed by hydrostatic testing to ensure that the pipe-section is able to undergo an internal pressure up to 100 MPa, and/or
  end bevelling of the pipe-section, and/or
  external and/or internal coating of the pipe-section to protect the internal and/or external surface of the pipe-section from corrosion.

According to one embodiment of the present invention, the method of the present invention comprises at least the steps of:
  (i) providing a pipe-section having first and second pipe-ends by:
    ($i_0$) preparing a metal plate or strip, for example by edge milling the edges of said metal plate or strip;
    ($i_1$) forming said metal plate or strip into a tube having first and second pipe-ends;
    ($i_2$) performing at least one seam weld along the tube to join the edges of the metal plate or strip to form the pipe-section;
  (ii) defining a first portion L1 of the longitudinal length of the pipe-section from the first pipe-end being in the range 3% to 40% of the overall length of the pipe-section;
  (iii) defining a second portion L2 of the longitudinal length of the pipe-section from the end of L1 towards the second pipe-end;
  (iv) heating at least the first portion L1 to at least a first temperature T1 of at least 500° C. for at least 2 minutes;
  (v) maintaining a second temperature T2 of the second portion L2 during step (iv) below the temperature T1;
  (vi) end bevelling the ends of the pipe-section; and
  (vii) coating the internal and/or the external surface of the pipe-section.

Optionally, a liner is added to a so-formed pipe-section as an internal liner having a thickness typically in the range 1-8mm, such as in the range 2.5-3 mm, which is hydraulically or mechanically expanded within the outer pipe to form a pipe-section suitable for forming a Mechanically Lined Pipeline (MLP).

Optionally, the pipe-section is 12 m long, 24 m long or 48 m long. Optionally the pipe-section is longer, such as 1km long.

Optionally, the outer diameter of the pipe-section is in the range 15cm to 60cm. Such diameters include 6 inches (15.2 cm), 8 inches (20.3 cm), 12 inches (30.5 cm) 16 inches (40.6cm), 18 inches (45.7 cm) and 20 inches (50.8cm).

Optionally, the thickness of the pipe section is from 4 mm to 50 mm. The thickness of the pipe-section is uniform along the length of the pipe-section. According to the invention, the term "uniform" is understood as accommodating variations of the wall thickness due to aspects of the manufacturing process that do not affect the comportment of the pipe section and due to optional end bevelling. The tolerances of typical pipe-section are in the range of +20% to −10% of the wall thickness of the pipe section for pipe section having a thickness superior to 50.8 cm and in the range of +15 to −13% of the wall thickness of the pipe-section for pipe-section having a thickness inferior to 50.8 cm.

The wall thickness of the pipe-section may be determined by use of a mechanical calliper according to API5L, December 2004, page 11, paragraph 7.3.

For step (ii) of the method of the present invention, a first portion L1 of the longitudinal length of the pipe-section is defined as being from a first pipe-end, and in the range 3% to 40% of the overall length of the pipe-section. Optionally, the longitudinal length of the first portion L1 is in the range 3-30%, or 3-20%, or 3-10%, or 4-20%, or 4-15%, or 4-10%, or 5-20%, or 5-15%, or 5-10%.

Thus, for a pipe-section being 12m long, a first length portion L1 could be in the range from 300 cm up to 1 or 2metres, such as 35 cm, 40 cm, 45 cm, 50 cm, 60 cm, 70 cm, 80 cm, 90 cm or 1 metre.

For step (iii) of the method of the present invention, a second portion L2 of the longitudinal length of the pipe-section is defined as being from the end of the first portion L1 towards the second pipe-end.

In one embodiment of the present invention, step (iii) comprises defining a second length portion L2 of the longitudinal length of the pipe-section from the end of the first portion L1 to the second pipe-end. That is, one end of the pipe-section is undergoing the method of the present invention.

In another embodiment of the present invention, the method further comprises the steps of:
  defining a third portion L3 of the longitudinal length of the pipe-section from the second pipe-end being in the range 3% to 40% of the overall length of the pipe-section, and defining the second portion L2 as the intermediate longitudinal length of the pipe-section between the end of the first portion L1 and the end of the third portion L3;
  heating the first portion L1 and the third portion L3 to at least a first temperature T1 of at least 500° C. for at least 2 minutes; and
  maintaining a second temperature T2 of the second portion L2 during the heating of the first portion L1 and third portion L3 below the first temperature T1.

In one arrangement of this embodiment of the invention involving a third portion L3, the method comprises the steps of:
  simultaneously heating the first portion L1 and the third portion L3 to at least a first temperature T1 of at least 500° C. for at least 2 minutes; and
  maintaining a second temperature T2 of the second portion L2 during the heating of the first portion L1 and third portion L3 below the first temperature T1.

In another arrangement of this embodiment of the invention involving a third portion L3, the method comprises the steps of:
  sequentially heating the first portion L1 and the third portion L3 to at least a first temperature T1 of at least 500° C. for at least 2 minutes; and
  maintaining a second temperature T2 of the second portion L2 during the heating of the first portion L1 and the third portion L3 below the first temperature T1.

The timing of the sequential heating of the first and third portions L1 and L3 may be the same as or similar to the embodiment of the present invention defining only the first and second portions L1 and L2.

The skilled man can see that the heating of both ends of the pipe-section can be carried out in co-ordination with each other, or without co-ordination with each other.

A longitudinal length of the third portion L3 may be in the range 3-30%, or 3-20%, or 3-10%, or 4-20%, or 4-15%, or 4-10%, or 5-20%, or 5-15%, or 5-10%. The longitudinal length of the first portion L1 may be the same or different to any defined third portion L3.

Thus, for a pipe-section being 12 m long, any third portion L3 could be in the range from 20 cm up to 1 or 2 metres, such as 35 cm, 40 cm, 45 cm, 50 cm, 60 cm, 70 cm, 80 cm, 90 cm or 1 metre.

The first portion L1, or any third portion L3, or both such portions L1 and L3, is or are heated to at least a first temperature T1 of at least 500° C. for at least 2 minutes.

Optionally, the first portion L1, or any third portion L3, or both such portions L1 and L3, is or are heated to at least a first temperature T1 of at least 500° C. for a time in the range 10 minutes to 120 minutes.

Optionally, the first portion L1, or any third portion L3, or both such portions L1 and L3, is or are heated to a temperature T1 in the range 600° C. to 1000° C., such as but not limited to 600° C., 650° C., 700° C., 750° C., 800° C., 850° C., 900° C., 950° C. and 1000° C.

The minimum first temperature T1 used for the first portion L1 and any for the third portion L3 may be the same or different.

Optionally, the time period is one of 10, 20, 30, 40, 50, 60, 70, 80, 90, 100, 110 and 120 minutes. The skilled man can understand that the dimensions and parameters selected for both the first portion L1 and the first temperature T1, as well as optionally the thickness of the pipe-section, and optionally the thickness of each of a multi-layered pipe-section, will result in the selection of a suitable first temperature T1 and time period, to achieve the effect of the invention, such that it is possible to select one or more of the temperatures and time periods described herein to suit, and without being an intermediate generalisation of the selection of such parameters.

The timing of heating the first portion L1 with any third portion L3 may be the same or different.

The heating of the first portion L1 and any third portion L3 can be achieved using various different methods and means known in the art, including but not limited to one or more of the group comprising: internal heating, external heating, induction heating, gas heating. The skilled man is aware of ways to heat a length of a pipe-section, using various different induction, electric, gas or combination heating systems.

The skilled man also recognises that the amount of heating may be dependent upon the outer diameter of the pipe-section, and/or the inner diameter of the pipe-section over the first length portion. A smaller outer diameter and a thicker pipe-section may require higher cold working percentage, and therefore may require higher temperatures to achieve the 'stress release' being achieved by the heat treatment provided.

During the heating of at least the first portion L1 to at least a first temperature T1 of at least 500° C. for at least 2 minutes, the present invention involves maintaining a second temperature T2 of the second portion L2 during step (iv) below the first temperature T1. The term "maintaining" or variant thereof as used herein includes any active or passive way of maintaining the second temperature T2 of the second portion L2 during step (iv) below the first temperature T1, including but not limited to one or more of the group comprising: cooling the second portion L2 with a fluid such as air or a liquid, applying a thermal insulation sleeve to the second portion L2.

Optionally, the yield strength delta between the first portion L1 or any third portion L3 and the second portion L2 is in the range 40 MPa and 60 MPa. The yield strength delta is defined as the difference between the second portion L2 yield strength and the first portion L1 or any third portion L3 yield strength.

Figure 2A:
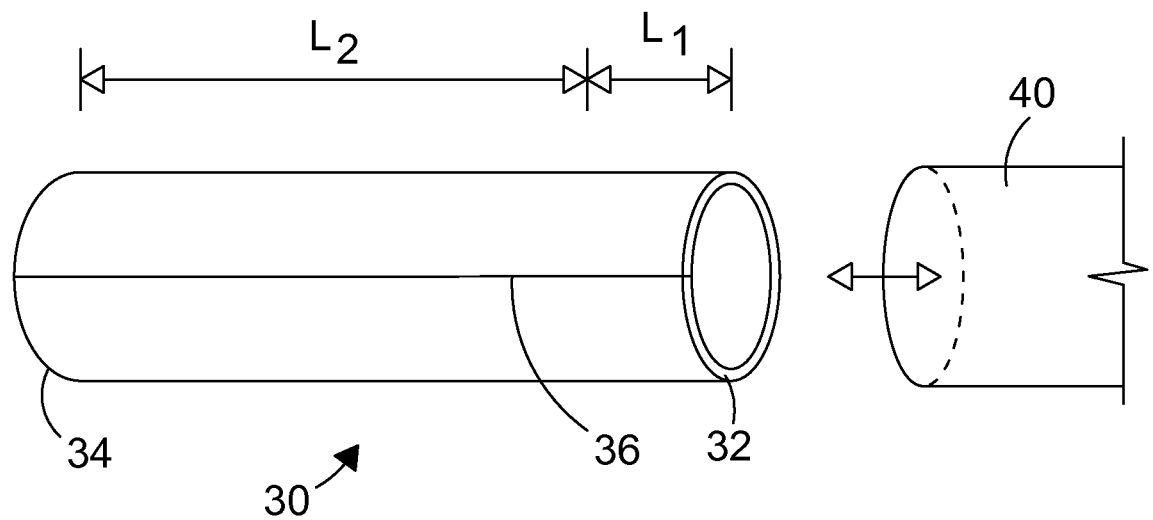
FIGS. 2a and 2b are schematic cross-sectional views of a first method of preparing a first pipe-section referred to in embodiments of the present invention.
Figure 2B:
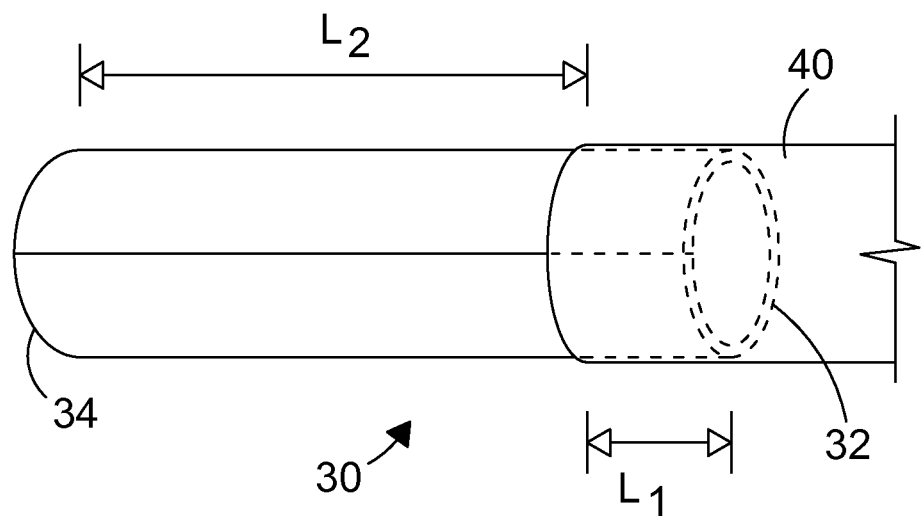

FIGS. 2a and 2b show a first method of preparing a first pipe-section as defined herein.

FIG. 2a shows a first pipe-section 30 having a seam 36 between the first and second ends 32, 34, which seam 36 has been internally welded along its length in order to provide a partly seam-welded pipe-section.

FIG. 2a shows defining a first portion L1 of the longitudinal length of the pipe section 30 from the first pipe end 32, and defining the remaining longitudinal length of the pipe section 30 as a second portion L2 to the second end 34.

FIG. 2a also shows an induction heater 40. The induction heater 40 is moveable from a position separate to the pipe-section 30 shown in FIG. 2a, to a position shown in FIG. 2b wherein the end of the induction heater 40 covers the pipe section 30 along the length of the first portion L1 from the first end 32, so as to be able to heat the first portion L1 to at least a first temperature T1 of at least 500° C. for at least 2 minutes. Meanwhile, the second portion L2 is maintained at a second temperature T2 during the heating regime, and to a temperature below the first temperature T1.

Figure 3A:
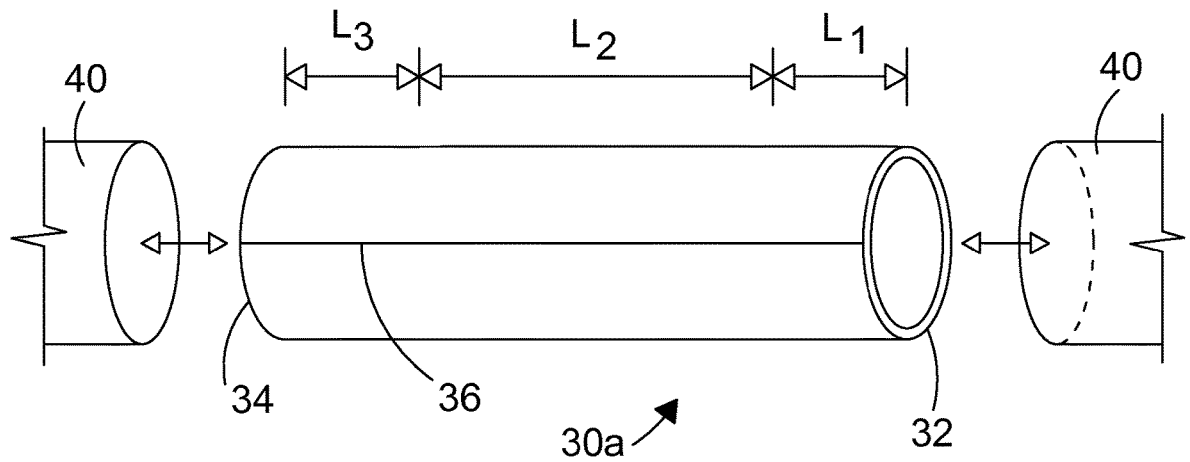
FIGS. 3a and 3b are schematic cross-sectional views of a second method of preparing a second pipe-section referred to in embodiments of the present invention.
Figure 3B:
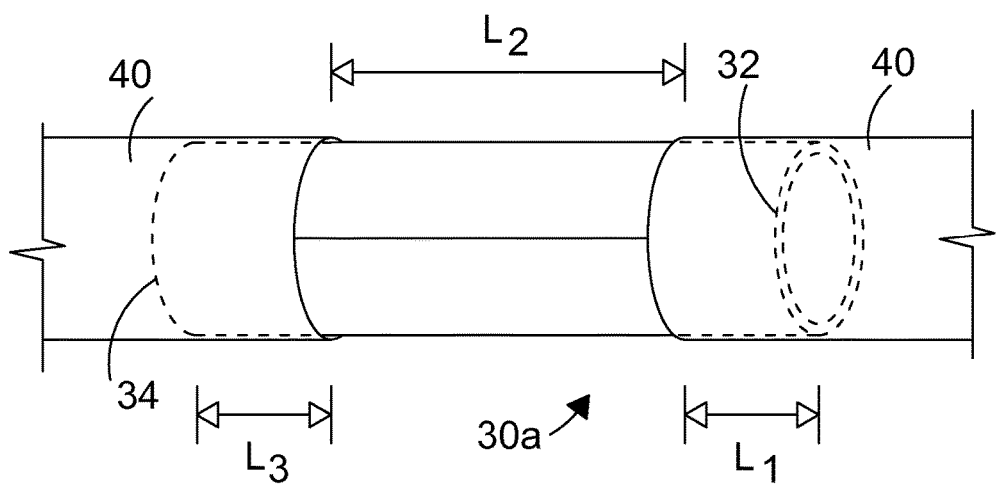

FIGS. 3a and 3b show a second method of preparing a second pipe-section as defined herein.

FIG. 3a shows a second pipe-section 30a having a seam 36 between the first and second ends 32, 34.

FIG. 3a shows defining a first portion L1 of the longitudinal length of the pipe section 30a from the first pipe end 32 in the same or similar manner as shown in FIG. 2a.

FIG. 3a also shows defining a third portion L3 of the longitudinal length of the pipe section 30a from the second end 34, and defining the remaining intermediate longitudinal length of the pipe section 30 as a second portion L2.

FIG. 3a shows two induction heaters 40. The induction heaters 40 are moveable from a position separate to the pipe-section 30a as shown in FIG. 3a, to a position in FIG. 3b wherein an end of each induction heater 40 covers the pipe section 30a along the length L1 from the first end 32 and along the length L3 from the second end 34, so as to be able to heat the first and third portions L1 and L3 to at least a first temperature T1 of at least 500° C. for at least 2 minutes. Meanwhile, the second portion L2 is maintained at a second temperature T2 during the heating regime, and to a temperature below T1.

A heating regime for an induction heater 40 may be a heating rate between 10° C./min and 300° C./min to reach the first temperature T1, a holding time for the first temperature T1 between 10 minutes and 200 minutes, followed by a cooling rate between 10° C./min and 300° C./min.

A typical heating regime for an induction heater 40 may be a heating rate of 10° C./min to reach the first temperature T1, a holding time for the first temperature T1 of 60 minutes, followed by a cooling rate of 10° C./min back down to ambient or near-ambient temperature. The skilled man can see many other heating regimes able to achieve the effect of the present invention.

Figure 4:
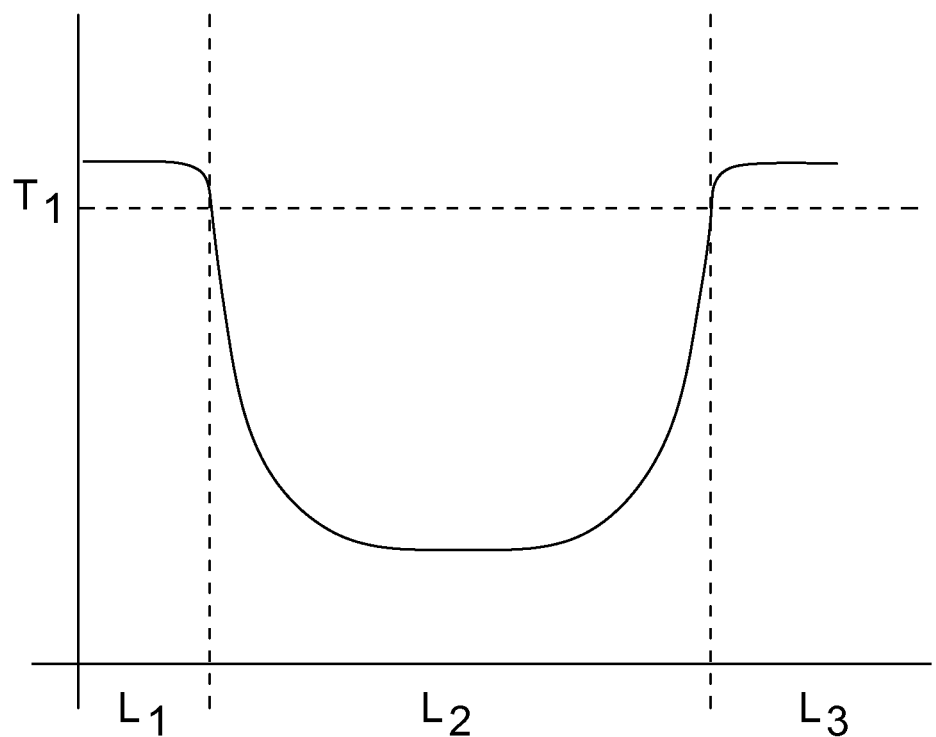
FIG. 4 is a temperature profile during a method of preparing the pipe-section of FIG. 3b according to an embodiment of the present invention.

FIG. 4 shows a schematic graph of the temperature along the longitudinal length of the pipeline 30a during the second method of the present invention shown in FIG. 3b. The first and third portions L1 and L3 are shown as being at least or above the first temperature T1, whilst the temperature of the intermediate portion L2 is below the first temperature T1.

The present invention provides a pipe-section obtainable by a method as described herein. The heat treatment provided to the first portion L1 improves the mechanical properties of the first end 32 over the length of the first portion L1, in particular by providing stress relief heat treatment, i.e. reducing the stress created in the formation of the pipe section 30, and by reducing the strain capacity also formed during the provision of the pipe section 30. The first pipe end 32 is now prepared for welding to another suitably prepared pipe end of another pipe-section, optionally by one or more girth welds in a manner known in the art, to create an assembly of at least two, optionally several, pipe-sections to form a pipe stalk or a pipeline.

The present invention can similarly provide a third portion L3 with improved mechanical properties of the second end 34 over the length of the third portion L3, in particular by providing stress relief heat treatment, i.e. reducing the stress created in the formation of the pipe section 30, and by reducing the strain capacity also formed during the provision of the pipe section 30. The second pipe end 34 is now prepared for welding to another suitably prepared pipe end of another pipe-section, optionally by one or more girth welds in a manner known in the art, to create an assembly of at least two, optionally several, pipe-sections to form a pipe stalk or a pipeline.

In the present invention, a decrease of mechanical properties can be tolerated at the middle of the pipe-section for at least reel-laying purposes. And thus, a heat treatment to recover suitable mechanical properties is required only at the end or ends of the pipe-sections being used for conjoining with other pipe-sections, as it is these, regions of the overall pipeline that is the most sensitive to local buckling.

In particular, the present invention seeks to reduce the effect of cold working performed to provide the pipe-section, which typically induces high stress levels. Thus, the effect of the present invention is to reduce the yield-to-tensile ratio to 0.9 or less over the first portion L1, prior to welding the first end to the next pipe-section.

The skilled man can see that by welding a number of pipe-sections obtainable by the method of the present invention, there is provided a pipeline comprising a plurality of pipe-sections as defined herein.

Optionally, the so-formed pipeline is a reel-lay pipeline, suitable for reel-laying from a vessel in a marine environment, particularly but not exclusively as described herein.

The present invention also provides a method of forming a pipeline comprising a plurality of conjoined pipe-sections as defined herein, comprising at least the steps of:
  providing at least two pipe-sections as defined herein;
  providing a pre-heat treatment to the ends of the pipe-sections to be joined; and
  girth welding the two pipe-sections together.

Optionally, the pipe-sections undergo one or more additional steps as defined herein prior to girth welding. Such steps include but are not limited to:
  non-destructive testing of the welds to detect potential defects, and/or
  mechanical expansion of the pipe-section followed by hydrostatic testing to ensure that the pipe-section is able to undergo a pressure up to 100 MPa, and/or
  end bevelling of the pipe-section, and/or
  external and/or internal coating of the pipe-section to protect the internal and/or external surface of the pipe-section from corrosion.

Optionally, a liner is added to a so-formed pipe-section as an internal liner as described herein, which is hydraulically or mechanically expanded within the outer pipe to form a mechanically lined pipeline (MLP) section.

Optionally, in the method of forming a pipeline as defined herein, the step of providing a pre-heat treatment to the ends of the pipe-sections to be joined is wholly or partly the step of heating at least the first portion to at least a first temperature T1 of at least 500° C. for at least 2 minutes as defined herein.

With the provision of a reel-lay pipeline according to embodiments of the present invention, the present invention extends to a method of reel-laying a reel-lay pipeline from a vessel comprising at least the steps of:
(a) providing a reel-lay pipeline as defined herein on a reel;
(b) passing the reel-lay pipeline from the reel to a pipeline-launch assembly and into a sea-environment. This method can be carried out using the arrangement shown in FIG. 1 of a method of reel-laying a pipeline from a reel.

The present invention provides a method of reducing residual stress within a pipe-section, in particular a steel pipe-section, for subsequent reel-lay installation, before joining the pipe-section to an adjacent pipe-section or structure. In particular, the methods of the present invention enhance the properties of the subsequent welding of the pipe-section to another pipe-section, in order to provide a pipeline having greater outer diameter than previously possible without affecting the properties of the pipeline once layed.

The invention claimed is:

1. A method of forming a pipeline comprising a plurality of conjoined pipe-sections comprising the steps of:
providing at least two pipe-sections;
providing a pre-heat treatment to the ends of the pipe-sections to be joined; and
girth welding the two pipe-sections together;
wherein each pipe-section is formed in a method comprising at least the steps of:
(i) providing a seam-welded pipe-section having first and second pipe-ends and a seam weld;
(ii) defining a first portion L1 of the longitudinal length of the pipe-section from the first pipe-end being in the range 3% to 40% of the overall length of the pipe-section;
(iii) defining a second portion L2 of the longitudinal length of the pipe-section from the end of the first portion L1 towards the second pipe-end;
(iv) heating at least the first portion L1 to at least a first temperature T1 of at least 500° C. for at least 2 minutes; and
(v) maintaining a second temperature T2 of the second portion L2 during step (iv) below the first temperature T1,
(vi) defining a third portion L3 of the longitudinal length of the pipe-section from the second pipe-end being in the range 3% to 40% of the overall length of the pipe-section, and defining the second portion L2 as the intermediate longitudinal length of the pipe-section between the end of the first portion L1 and the end of the third portion L3;
(vii) heating the first portion L1 and the third portion L3 to at least the first temperature T1 of at least 500° C. for at least 2 minutes; and
(viii) maintaining the second temperature T2 of the second portion L2 during the heating of the first portion L1 and the third portion L3 below the first temperature T1,
wherein the seam weld is helical or parallel to the longitudinal axis of the pipe-section, and wherein step (i) comprises the steps of
preparing a metal plate or strip;
forming said metal plate or strip into a tube having first and second pipe-ends; and
performing at least one seam weld along the tube to join the edges of the metal plate or strip to form the pipe-section.

2. The method as claimed in claim 1, further comprising the steps of:
simultaneously heating the first portion L1 and the third portion L3 to at least the first temperature T1 of at least 500° C. for at least 2 minutes; and
maintaining the second temperature T2 of the second portion L2 during the heating of the first portion L1 and third portion L3 below the first temperature T1.

3. The method as claimed in claim 1, further comprising the steps of:
sequentially heating the first portion L1 and the third portion L3 to at least the first temperature T1 of at least 500° C. for at least 2 minutes; and
maintaining the second temperature T2 of the second portion L2 during the heating of the first portion L1 and the third portion L3 below the first temperature T1.

4. The method as claimed in claim 1, wherein the pipe-section is 12 m long or 24 m long.

5. The method as claimed in claim 1, wherein the outer diameter of the pipe-section is in the range 15 cm to 60 cm.

6. The method as claimed in claim 1, wherein the pipe-section is formed from one of the group comprising: a carbon steel from grade X52, X56, X60, X65, X70 or X80 according to API 5L, and a 22 Cr duplex, a 25 Cr Duplex, a 13 Cr-2 Mo, or a 13 Cr-2.5 Mo according to DNV-OS-F101.

7. The method as claimed in claim 1, wherein the longitudinal length of the first portion L1 is in the range 3-30%, or 3-20%, or 3-10%, or 4-20%, or 4-15%, or 4-10%, or 5-20%, or 5-15%, or 5-10%.

8. The method as claimed in claim 1 defining a third portion L3 of the longitudinal length of the pipe-section, wherein the longitudinal length of the third portion L3 is in the range 3-30%, or 3-20%, or 3-10%, or 4-20%, or 4-15%, or 4-10%, or 5-20%, or 5-15%, or 5-10%.

9. The method as claimed in claim 1, wherein the first temperature T1 is in the range 600° C. to 1000° C.

10. The method as claimed in claim 1, wherein the first portion L1 is heated to the first temperature T1 for a time in the range 10 minutes to 120 minutes.

11. The method as claimed in claim 1 defining a third portion L3 of the longitudinal length of the pipe-section wherein the third portion L3 is heated to the first temperature T1 for a time in the range 10 minutes to 120 minutes.

12. The method as claimed in claim 1, for preparing a pipe-section suitable for reeling onto a reel and for reel-laying.

13. The method of claim 1, wherein a liner is added to the pipe-section as an internal liner.

14. The method of claim 1, wherein the pipe-section is suitable for forming part of a mechanically lined pipe or a clad pipe.

15. The method of claim 1, wherein the pipe-section is formed from a flat sheet that is rolled into a cylinder and welded along a seam to have first and second pipe-ends.

* * * * *